US005179278A

United States Patent [19]
Douglas

[11] Patent Number: 5,179,278
[45] Date of Patent: Jan. 12, 1993

[54] MULTIPOLE INLET SYSTEM FOR ION TRAPS

[75] Inventor: Donald J. Douglas, Toronto, Canada

[73] Assignee: MDS Health Group Limited, Etobicoke, Canada

[21] Appl. No.: 749,369

[22] Filed: Aug. 23, 1991

[51] Int. Cl.[5] .............. B01D 59/44
[52] U.S. Cl. .............. 250/290; 250/292
[58] Field of Search .............. 250/290, 291, 292, 281, 250/282, 293

[56] References Cited

U.S. PATENT DOCUMENTS

| | | | |
|---|---|---|---|
| 3,334,225 | 8/1967 | Langmuir | 250/292 |
| 4,535,235 | 8/1985 | McIver, Jr. | 250/291 |
| 4,540,884 | 9/1985 | Stafford et al. | 250/292 |
| 4,686,365 | 8/1987 | Meek et al. | 250/290 |
| 4,736,101 | 4/1988 | Syka et al. | 250/290 |
| 4,739,165 | 4/1988 | Ghaderi et al. | 250/290 |
| 4,861,988 | 8/1989 | Henion et al. | 250/282 |
| 4,963,736 | 10/1990 | Douglas et al. | 250/292 |

*Primary Examiner*—Jack I. Berman
*Assistant Examiner*—Kiet T. Nguyen
*Attorney, Agent, or Firm*—Bereskin & Parr

[57] ABSTRACT

A two dimensional RF multipole field formed by a set of parallel rods, e.g. quadrupole rods, serves as an inlet for an ion trap. The field both accepts and stores ions for the trap, and rejects unwanted ions, while the trap is performing an analysis. This greatly increases the duty cycle of the overall system, increasing the system sensitivity.

12 Claims, 2 Drawing Sheets

MULTIPOLE INLET SYSTEM FOR ION TRAPS

FIELD OF THE INVENTION

This invention relates to the combination of a multipole (parallel rod) ion inlet and processing system with an ion trap mass spectrometer.

BACKGROUND OF THE INVENTION

Ion trap mass spectrometers (hereafter called ion traps) are well known devices for receiving and analyzing ions. Typical ion traps are shown in U.S. Pat. Nos. 4,736,101 issued Apr. 5, 1988 and 4,540,884 issued Sep. 10, 1985, both to Finnigan Corporation.

Ion traps typically employ a ring electrode and end caps which, when suitable RF and DC voltages are applied to them, provide a quadrupole field to trap ions within a storage region. However ion traps are usually relatively small in physical size and have the capacity to store only a limited number of ions. When the number of ions injected into an ion trap becomes too large, space charge effects occur which have a number of undesirable consequences. These consequences can include spontaneous emptying of the trap, shift in the mass calibration, distortion of the analysis results obtained from the ion trap, and the like.

In addition, when an ion trap is performing an analysis, it cannot accept additional ions. If a prolific ion source is used, the time taken to fill the ion trap can be much less than the time required for the ion trap to perform analysis. During the analysis time, the ions produced by the ion source may be wasted, resulting in a very low duty cycle for the ion trap and causing low sensitivity for the system.

BRIEF SUMMARY OF INVENTION

Accordingly, it is an object of the invention in one of its aspects to provide a method of analyzing ions in an ion trap comprising: producing a stream of said ions, directing said stream of ions into a two dimensional multipole RF field formed by an RF voltage applied to a set of parallel rods, storing some of said ions in said field within said rods and rejecting others of said ions from said rods, releasing the ions stored in said field within said rods into said ion trap, analyzing said ions in said trap, and while said ions are being analyzed in said trap, refilling said field within said rods with some ions from said ion stream while rejecting from said field within said rods other ions from said ion stream.

In another aspect the invention provides an ion inlet and processing system comprising: means for generating a stream of ions, a multipole set of parallel rods, means for applying an RF voltage to said rods for producing a two dimensional multipole RF field therein, means for directing said stream of ions into said set of rods, control means for controlling said rods to store some ions from said stream in said rods and to reject other ions from said rods, an ion trap, said control means including means for releasing ions stored from said rods into said ion trap, said control means including means for admitting new ions from said stream into said rods while said ion trap is performing an analysis, for said rods to store some of said new ions and to reject others while said ion trap is performing said analysis.

Further objects and advantages of the invention will appear from the following description, taken together with the accompanying drawings.

DETAILED DESCRIPTION OF PREFERRED EMBODIMENT

Figure 1:
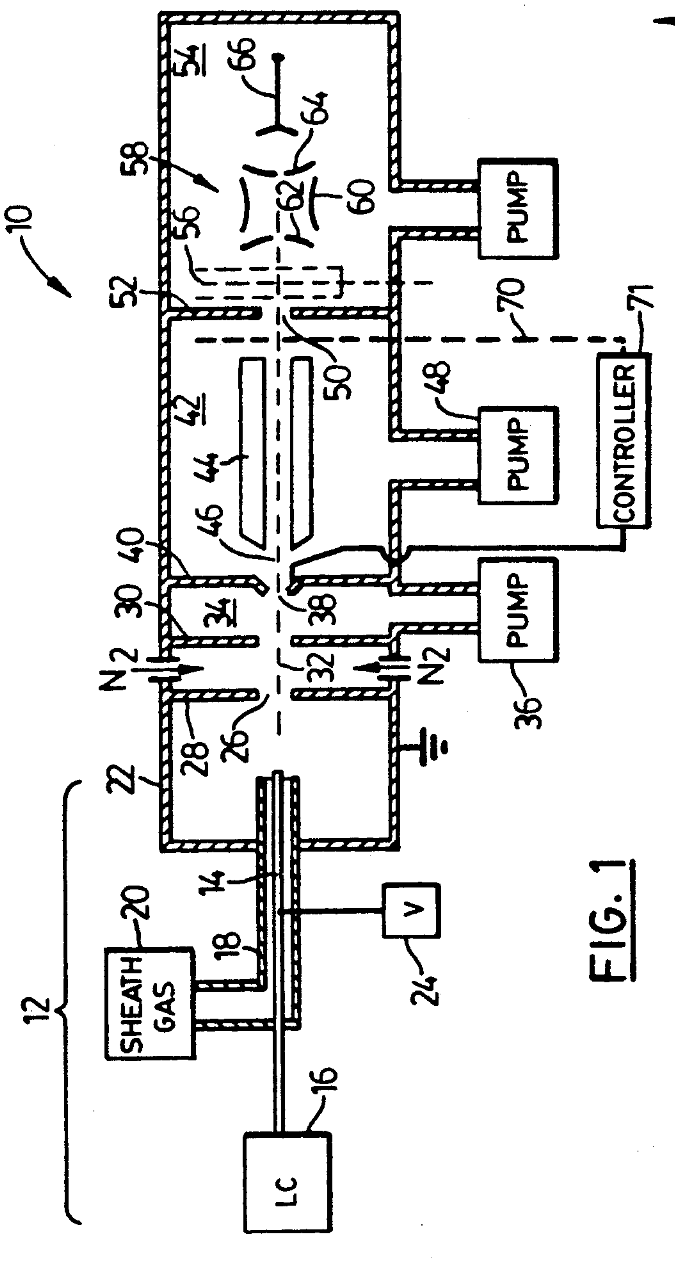
FIG. 1 is a diagrammatic view of an inlet system and ion trap according to the invention.

FIG. 1 shows a mass analyzer system 10 having a known ion source 12 such as the ion spray device shown in U.S. Pat. No. 4,861,988 issued Aug. 29, 1989 to Cornell Research Foundation, Inc. As shown, the ion source 12 includes a needle 14 which receives a liquid sample from a source such as a liquid chromatograph 16. A tube 18 encircles the needle 14 and supplies a relatively high velocity atomizing sheath gas (e.g. nitrogen) from source 20. The needle 14 discharges liquid into an atmospheric pressure chamber 22. The emerging liquid is atomized and evaporated by the sheath gas from source 20. Charge is applied to the evaporating liquid by an electric field created by the voltage difference between a voltage source 24 applied to needle 14, and the chamber 22 which is grounded. This produces ions.

The ions so produced pass in a stream through an orifice 26 in end plate 28 into a gas curtain chamber 30 in which nitrogen or other inert gas is injected, as described in the above mentioned U.S. Pat. No. 4,861,988. The ion stream then passes through another orifice 32 into another chamber 34 where some of the gas present is removed by pump 36.

The stream of ions, together with some gas from chamber 34, then passes through orifice 38 in plate 40 into a chamber 42 in which are located four rods 44 arranged in the configuration of a standard quadrupole mass spectrometer. The rods 44, as will be described, preferably have only RF applied to them, without DC. The stream of ions, indicated at 46, passes through rods 44.

The chamber 42 is connected to another pump 48, so that the rods 44 serve, as described in U.S. Pat. No. 4,963,736 issued Oct. 16, 1990 to MDS Health Group Limited, to separate most of the gas entering chamber 42 from the ion stream 46.

The ion stream 46 then passes through a interchamber orifice 50 in end plate 52 into another chamber 54. In chamber 54 the ions pass through a conventional ion lens 56 and then into a conventional ion trap 58 having a ring electrode 60 and end electrodes 62, 64. Ions enter the trap through an opening in the first end electrode 62. The ions, when ejected from the trap, leave through an opening in the second end electrode 64 and are then detected by detector 66.

The ion source 12 normally produces a relatively intense stream of ions. Typically it may produce $6\times10^8$ ions per second through orifice 38. The ion trap 58, however, can store only a limited number of ions. A calculation of the maximum number of ions that can be stored in the trap is as follows.

The ions are stored in an effective potential given by the known equation:

$$\psi = \frac{\overline{D}_z}{4Z_0^2}(x^2 + y^2 + 4Z^2) \quad (1)$$

where:

$\overline{D}_z$ is the electric well depth in the trap for motion in the z direction, and $\overline{D}_z = \frac{1}{8} q_z V$ where $q_z$ is the Mathieu parameter for motion in the z direction, and V is the zero to peak amplitude of the RF voltage applied to the ion trap, $Z_0$ is the distance from the center of the trap to the end electrodes, x is the distance from the center of the trap in the x direction, y is the distance from the center of the trap in the y direction.

The approximations inherent in equation (1) are most valid for low q (q less than 0.4)

This allows a maximum charge density $$\rho_{max} = \frac{3\,D_z\epsilon_0}{Z_0^2} \text{ (in MKS units)} \quad (2)$$

where $\epsilon_0$ is the permittivity of free space. Assume a typical example, in which $r_0 = 1.0$ cm (where $r_0 = \sqrt{x^2 + y^2}$
= distance from center of trap to ring electrode)

$Z_0 = 0.707$ cm
$q_z = 0.2$
ions are 100 amu (atomic mass units).
*RF* frequency = 1.0 MHz.

Then it is calculated that $\rho_{max} = 2.7 \times 10^{-12}$ coulombs/cm$^3$

This is $1.69 \times 10^7$ ions/cm$^3$.

Since the trap volume is $4/3\ \pi.\ X_0^2.r_0$ or $\frac{2}{3}$ cm$^3$, the maximum number of ions that can be stored is $1.13 \times 10^7$.

While the maximum number of ions that can be stored in the trap 58 is calculated to be about $1.1 \times 10^7$, in fact space charge problems are usually encountered once the number of ions in the trap increases beyond about 1/10 or this number, i.e. about $10^6$ ions. The duty cycle calculations which follow are performed for both these numbers.

Assuming that the trap 58 will hold $1 \times 10^7$ ions, and since the source 12 produces $6.2 \times 10^8$ ions per second, the time to fill the trap is $1 \times 10^7 / 6.2 \times 10^8 = 0.016$ seconds. The time to perform an analysis in an ion trap is typically 0.1 seconds (longer for MS/MS or high resolution scans), which includes the time taken to empty the trap (since the analysis usually consists of ejecting the ions sequentially and detecting them as they are ejected)

The duty cycle for the ion trap is:

$$\frac{\text{time to fill ion trap 58}}{\text{time to fill ion trap 58} + \text{time to perform analysis}} = \frac{0.016}{.116} = 0.14$$

If the total number of ions in the trap is limited to $10^6$, as is much more likely, then the duty cycle is only $$\frac{.0016}{.100 + .0016} = 0.0157$$

A duty cycle of 0.0157 means that more than 98% of the ions produced by the source are in effect thrown away (since while the trap is performing its analysis, no ions from the source 112 can be admitted to it). The adverse effect of throwing away so many ions is made even worse since in many cases few of the ions from the source are actually the trace ions of interest. With few trace ions available, one can ill afford to throw away a large percentage of them.

Assume, for example, that the concentration of trace ions of interest in the ion stream 46 is one in $10^5$. If the ion trap 58 will only accommodate $10^6$ ions, then when the ion trap is full, there will be only 10 trace ions in it to analyze. While the ion stream 46 continues to provide more trace ions, they are wasted. This can create enormous difficulty when using an ion trap to analyze low concentrations of trace ions in the presence of a large excess of concomitant ions.

When the quadrupole rods 44 are placed in the path of the ion stream 46 between the ion source 12 and the ion trap 58, the rods 44 can be used as a trap to store ions. This is accomplished by placing a grid 70 at the exit end of the rods 44 and connecting it to a controller 71. Typically the rods 44 are operated with a zero DC potential on them, and the DC potential at orifice 38 of plate 40 may typically be about +10v. DC. (also from controller 71). When a higher DC potential is placed on grid 70, e.g. up to about +20v. DC, ions reaching the exit end of the rods 44 are then reflected by grid 70 and travel back to the entrance of the rods. (Alternatively this can be accomplished by placing a higher voltage on plate 52 at orifice 50, and omitting grid 70.) At the entrance end, the ions are reflected back again by the normally relatively high voltage on plate 40. This causes ions in the rods 44 to cycle back and forth between the ends of the rods. In effect the ions are stored in the rods 44. Such storage of ions in quadrupole rods is described by C. Beaugrand et al in a paper entitled "Ion Kinetic Energy Measurement on Tandem Quadrupole Mass Spectrometers", presented at the 35th ASMS Conference on Mass Spectrometry May 24–29, 1987 at Denver, Colo. The trapping there described was in the RF only center cell of a triple tandem quadrupole mass spectrometer, and it was demonstrated that the trapping process was very efficient, with little or no ion loss.

An advantage of using quadrupole RF only rods as a pre-trap for an ion trap is that the RF only rods can store more ions than an ion trap and can be used to store ions while the ion trap is performing its analysis. Specifically, in a quadrupole trap such as that constituted by rods 44, the ions are stored in an effective potential given by $$\psi = \frac{x^2 + y^2}{r_0^2}\overline{D} \quad (3)$$

where x and y are distances in the x and y directions from the center of the rod set, $r_0$ is the distance from the center of the rod set to each rod, $\overline{D} = \frac{1}{8} qV$ where q is the Mathieu parameter and V is the zero to peak amplitude of the RF voltage applied to the rods.

This allows a maximum charge density in MKS max =(4)

$$\rho max = \frac{4 \bar{D}\epsilon_0}{r_0^2} \quad (4)$$

If for example $r_0=4$ mm, q=0.2, the frequency is 1.0 MHz, and the ions are of 100 amu, then the maximum charge density in rods 44 is $$\rho max = 3.65 \times 10^{-12} \text{ coulombs/cm}^3.$$

This is $2.28\times10^7$ ions/cm$^3$.

The volume of the trap formed by rods 44 is $\pi.r_0^2 l$ where l is the length of the rods. Assuming the rods 44 are 15 cm long, the volume is about 7.5 cm$^3$ Therefore the number of ions that can be stored in the quadrupole trap formed by rods 44 is about $1.7\times10^8$. This is about 15 times larger than the number which can be stored in the ion trap 58. Physically this is because the length of the quadrupole rods is 15 times the ion trap "length".

When ions are collected in the rods 44, there is little point in collecting more than the $1.1\times10^7$ ions that the ion trap 58 can accept. To collect this number of ions, when the ions are being provided at the rate of $6.2\times10^8$ ions per second from source 12, requires 0.016 seconds. (After the required number of ions is collected controller 71 raises the DC potential at orifice 38 of plate 40, cutting off further flow of ions into the rods 44 from the source 12. The gain now is that ions can be collected by rods 44 while the ion trap 58 is performing an analysis. The duty cycle is now:

$$\frac{\text{time to collect ions sufficient to fill ion trap 58}}{\text{time to empty rods 44 into ion trap 58 + time for ion trap 58 to perform analysis}}$$

Assuming that it takes about 1 ms (millisecond) to empty ions trapped in rods 44, into the ion trap 58, and that it takes 100 ms as before for the ion trap 58 to perform an analysis, the duty cycle is $$\frac{.016}{.001 + .100} = .158$$

If only $1\times10^6$ ions are collected, the duty cycle is $$\frac{.0016}{.001 + .100} = 0.0158$$

This is only a very small improvement over the previous case. More than 98% of ions from source 12 are still thrown away if only $10^6$ ions can be stored.

Assume next that the rods 44 are used for pretrapping ions, as before, while the ion trap 58 is performing its analysis, but assume in addition that while rods 44 are pre-trapping ions, they are also used to reject unwanted ions. Thus they also perform a concentration function.

There are several ways in which rods 44 can be used to eject unwanted ions, as will be described. One method is to set the RF voltage on the rods at a fixed level to eject ions of unwanted mass. Another is to add an auxiliary RF frequency to produce resonant ejection of the unwanted ions. A third is to apply some DC to the rods 44 so that they act as a low resolution mass spectrometer. In all cases, usually low mass unwanted ions are ejected.

Assume firstly that the rods 44 are used to perform concentration by ejecting unwanted ions, but that they do not perform any pre-trapping.

Assume also, as an example, that the low mass unwanted ions comprise 90% of the ion current from source 12. The desired ion current is then $6.2\times10^7$ ions per second. To collect $10^7$ ions (the trap limit) takes 0.16 seconds. If, as before, the analysis time is 100 ms, then the duty cycle is $$\frac{.16}{.16 + .100} = 0.62$$

To collect $10^6$ ions takes 0.016 seconds, so the duty cycle in that case is $$\frac{.016}{.016 + .100} = 0.14$$

This is a substantial improvement over the previously described duty cycles, since now more of the ion flow is used. However much of the ion flow from the source 12 is still thrown away.

When the RF only rods 40 are used both to trap ions, and to eject unwanted ions, the situation changes considerably. Assume again that unwanted low mass ions comprise 90% of the ion current as is typical. Assume that these unwanted ions are ejected from rods 44 by adjusting the RF level on the rods, as will be described.

Because 90% of the ions are being ejected, the effective ion current is $6.2\times10^7$ ions per second. To collect the number of ions which the ion trap 58 will accommodate, i.e. $10^7$, takes 0.161 seconds. These ions can be dumped into the ion trap 58 from the rods 44 in one ms, and collection can again begin in the rods 44 while the trap is performing an analysis. The duty cycle is therefore $$\frac{0.161}{0.161 + .001} = .994$$

If $10^6$ ions are collected, the time taken to collect these ions becomes less than the time required by the trap for analysis, and the duty cycle becomes $$\frac{.016}{.100 + .001} = 0.16$$

It will be seen from the above example that when $10^7$ ions are collected, more than 99% of the ions from the source 12 are used, and fewer than 1% are thrown away. This is an improvement by a factor of more than six over use of the ion trap 58 without the rods 44, and it is also an improvement over use of the ion trap 58 with the rods 44 where these rods are used to perform pre-trapping only, or where the rods 44 are used only to perform ejection of unwanted ions. When $10^6$ ions are collected, the duty cycle increases (in the examples given) from 0.014 to 0.16, or by about an order of magnitude.

If resonant ejection (by scanning the RF frequency of level applied to rods 44) is used to remove unwanted ions from the rods 44, then some time, typically 100 ms, is required for the resonant ejection step. During the scanning which produces resonant ejection, ions cannot be collected (and are prevented from entering the rods 44 by controller 71).

To fill the rods 44 to their capacity with $1.7 \times 10^8$ ions, when source 12 supplies $6.2\times 10^8$ ions per second, takes 0.274 seconds. Since to eject unwanted ions takes 100 ms, the duty cycle is $$\frac{0.274}{0.274 + 0.100} = 0.73$$

This duty cycle is less than that achieved when unwanted ions are ejected by setting the RF level on the rods 44 to an appropriate voltage, but is still higher than that achieved by using the rods 44 only for trapping, or only for ejection of unwanted ions.

Since space charge effects in traps are encountered at about 10% of the space charge limit (equation 2), and since similar behavior may apply to the RF rods, assume next that the rods 44 are filled with only $1.7\times 10^7$ ions. The duty cycle is now $$\frac{.0274}{.0274 + .100} = 0.22$$

which is much better than the 0.014 duty cycle achieved when the rods 44 were not used.

Unwanted ions can also be ejected by applying a low level DC voltage to the rods 44, in which case the rods 44 are no longer RF only rods but act as a low resolution mass filter. Such ion ejection is very fast, occurring in less than 1 ms. To fill the rods 44 to their capacity of $1.1\times 10^8$ ions, as in the previous example, takes 0.274 seconds. To eject unwanted ions takes about 1 ms and then to fill the trap takes a further 1 ms. The duty cycle is then $$\frac{.274}{.274 + .001 + .001} = .993$$

This very high duty cycle means that less than 1% of the ion stream from ion source 12 is now thrown away.

Assuming that space charge effects in the rods 44 permit collection of only $1.7\times 10^7$ ions as previously described, then the duty cycle is:

$$\frac{\text{time to collect ions}}{\text{time to dump ions into trap + trap analysis time}} = \frac{.0274}{.001 + .100} = 0.274$$

Various methods of ejecting unwanted ions will next be described in more detail.

Figure 2:
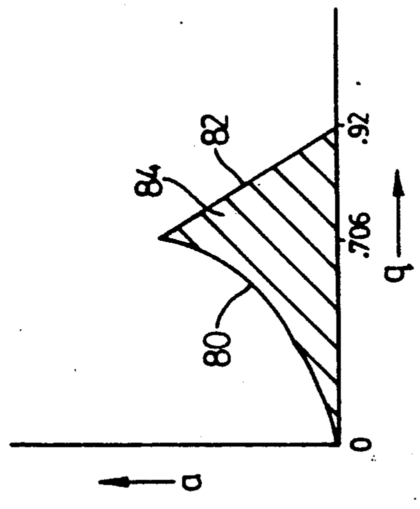
FIG. 2 is a conventional stability diagram for a quadrupole mass spectrometer.

Reference is made to FIG. 2, which is a standard stability diagram for a two dimensional field quadrupole mass spectrometer such as that formed by rods 44. FIG. 2 plots a against q, where $$a = \frac{4e \cdot \text{DC voltage applied between rods 44}}{\Omega^2 r_0^2 m}$$

$$q = \frac{2e \cdot \text{peak to peak RF voltage applied between rods 44}}{\Omega^2 r_0^2 m}$$

where m is the mass of the ion of interest $r_0$ is the radius of the inscribed circle between the rods 44

Ω is the angular frequency of the applied RF e is the electronic charge

For values of a and q within the shaded region 84, ion trajectories are stable. Line 82 corresponds to ions becoming unstable in the x direction, while line 80 corresponds to ions becoming unstable in the y direction. For a given RF and DC voltage on the rods, this produces a low mass cut-off at line 82 and a high mass cut-off at line 80. As is standard for all quadrupole mass spectrometers, the high and low mass cut-off lines 80, 82 intersect at a value of q=0.706.

When the quadrupole is operated with RF only on its rods, it operates on the q axis (since a=0) and essentially acts as an ion pipe. However when the RF voltage is set at an appropriate level, ions below a desired mass will have their q above about 0.92 and hence will have unstable trajectories and will be ejected. For example all ions below mass 500 amu may be ejected in this manner. The rods 44 can thus be used to perform both pre-trapping and ion ejection.

Figure 3:
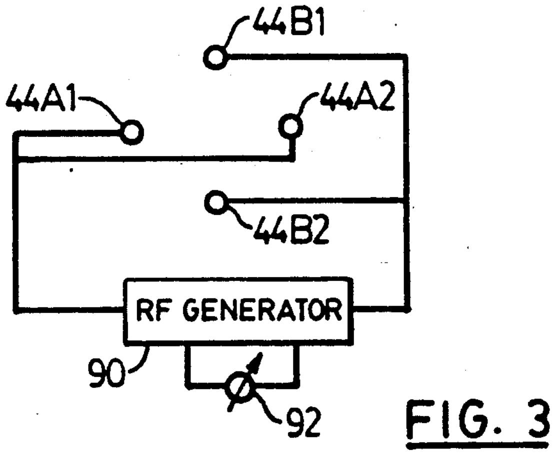
FIG. 3 shows the connection of an RF generator to quadrupole rods.

As shown in FIG. 3, the rods 44 can be designated as rods 44A1, 44A2, and 44B1, 44B2. Rods 44A1, 44A2 are connected together and to one side of an RF generator 90, and rods 44B1, 44B2 are connected together and to the other side of generator 90. The RF amplitude provided by generator 90 is adjusted by setting control 92. Since ions below the selected mass cutoff are ejected as the ions fill the rods 44, essentially no extra time is required for this ejection step, resulting in a very high duty cycle.

Resonant ejection of ions from the rods 44 will next be described. Such ejection has been described by Watson et al in an article entitled "A Technique for Mass Selective Ion Rejection in a Quadrupole Reaction Chamber", International Journal of Mass Spectrom. Ion Proc., vol. 93, p225-235, 1989. In particular, it can be calculated that the characteristic angular frequencies of motion (w) of the ions are $$w=(2n+\beta)_2{}^{106} \tag{5}$$

where n is an integer, Ω is the angular frequency of the RF voltage, and β is a function of the q of the mass spectrometer. To a good approximation, β is given by $$\beta = \left(a + \frac{q^2}{2}\right)^{\frac{1}{2}} \tag{6}$$

For example, assuming an RF frequency f=1.0 MHz and that the quadrupole rods 44 are operated at q=0.2, then for the case where a=0, β is given by $$\beta=q/\sqrt{2} \tag{7}$$

Figure 4:
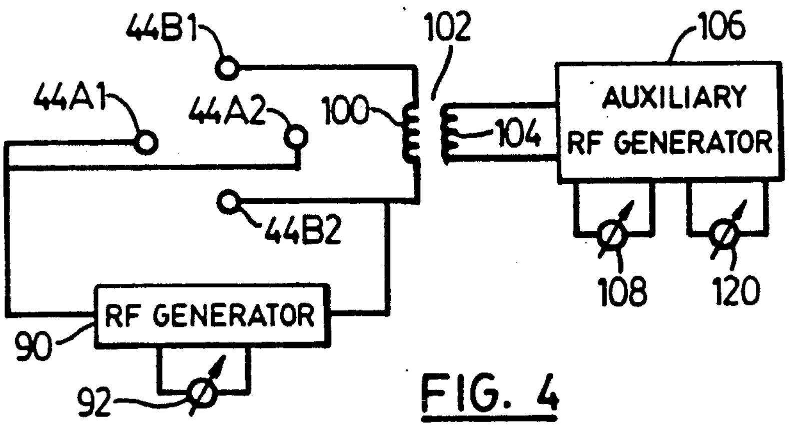
FIG. 4 shows the connection of an RF generator and an auxiliary RF generator to quadrupole rods.

The calculated resonant frequencies (in $\sec^{-1}$) of the ions are then $n = 0$ $w = 4.44 \times 10^5$ $(f = 7.05 \times 10^4)$
$n = 1$ $w = 6.72 \times 10^6$ $(f = 1.07 \times 10^6)$
$n = 2$ $w = 1.30 \times 10^7$ $(f = 2.07 \times 10^6)$
$n = 3$ $w = 1.93 \times 10^7$ $(f = 3.07 \times 10^6)$ To eject unwanted ions by resonant ejection, the arrangement of FIG. 4 is used (as described in the Langmuir U.S. Pat. No. 3,334,225 issued Aug. 1, 1967). As shown, the connection between two of the rods, e.g. rods 44B1, 44B2, has inserted therein one winding 100 of the transformer 102. The other winding 104 of the transformer is connected to an auxiliary RF voltage generator 106. The frequency of generator 106 is scanned, using control 108, through the resonant frequencies of the unwanted ions. The additional energy imparted to each unwanted ion by this process increases the amplitude of the ion's trajectory, causing it to leave the space between the rods, i.e. it is ejected. By scanning the frequency of the auxiliary generator 106, unwanted ions can thus be ejected.

Since the resonant ejection scan can take some time (e.g. 0.1 seconds), the duty cycle of the system operated in this manner may be only about 0.73 in a typical application, as described above.

Figure 5:
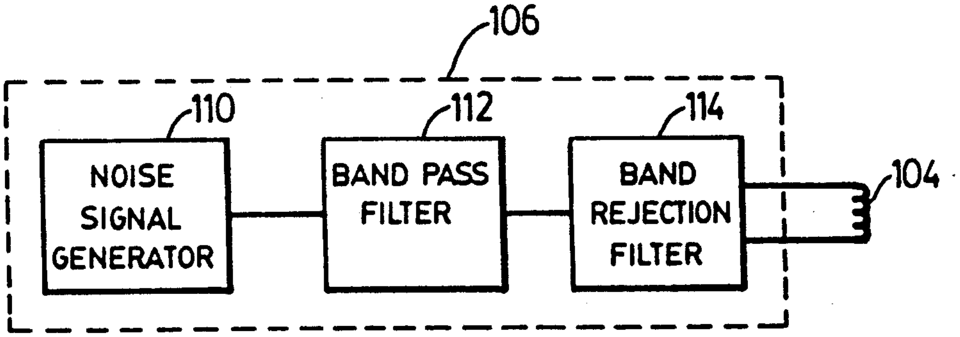
FIG. 5 shows details of an auxiliary RF generator.

While scanning the frequency of generator 106 has been described, generator 106 can also be used to produce a noise spectrum having frequency components which will eject all ions except those desired. The noise spectrum will omit those frequencies at which the desired ion or ions are resonant. Such resonant ejection using a noise spectrum is described in the above mentioned Langmuir U.S. Pat. No. 3,334,225 for a quadrupole mass spectrometer with RF and DC voltages applied to the rods. In the present case, generator 106 will thus include (FIG. 5) a noise signal generator 110 to produce the noise spectrum, a band pass filter 112 to pass the desired components, and a band rejection filter 114 to remove frequencies corresponding to the resonant frequencies of the desired ions. The use of a noise signal can take less time than scanning, thereby improving the duty cycle.

Alternatively, unwanted ions may be ejected by leaving the RF frequency constant and scanning the level of the RF between the A and the B rods. This is accomplished by adopting a typical operating point, e.g. $q=0.2$. The scan is then begun with a low RF amplitude (using amplitude control 92 of generator 90 and amplitude control 120 of generator 106) so that the lowest mass to be ejected is in resonance with the excitation frequency at $q=0.2$. The RF amplitude is then increased (using amplitude control 92 of generator 90), while the frequencies of generators 90, 106 are fixed, to bring ions of higher mass to $q=0.2$, and these are then ejected by resonant excitation. The mass of the ion or ions to be isolated is omitted from the scan. The scan can continue to masses higher than that of the selected ion, but this cannot be done without limit. Eventually a mass is reached where the q of the ion to be stored increases to 0.9 (the stability diagram limit) and the ion becomes unstable and cannot be stored.

The maximum mass (m max) that can be ejected in this manner is given by $$m_{max} = m\left(\frac{0.9}{q}\right) \tag{8}$$

where m is the mass of the ion to be isolated.

As an example, assume that the rods 44 are operated at $q=0.2$ and it is desired to isolate mass 810. The maximum mass that can be ejected before mass 810 reaches a q or 0.9 is:

$$m_{max} = 810\left(\frac{0.9}{0.2}\right) = 3645$$

This high mass limit is acceptable in many applications and is therefore not a severe limitation.

Scanning the RF amplitude rather than the RF frequency will also take some time (e.g. about 0.1 seconds), and therefore the duty cycle for the system operated in this manner will typically be about the same as when the RF frequency is varied (0.73 in the example previously given).

Another method of ejecting unwanted ions is by applying DC between the A poles and the B poles of the rods 44. In this case generator 90 will supply DC as well as RF and the operating line moves off the q axis and the rods 44 simply act as a low resolution mass filter. However it may be difficult to store many ions in the rods 44 if they are operated as a mass filter, unless the gas pressure in the rods 44 is relatively low so that the number of collisions which the ions incur when they are stored in the rods is limited. In addition space charge effects may become more severe.

If desired, ions of interest trapped in the RF rods 44 can be further processed by exciting their lowest or other resonant frequencies sufficiently to cause collision induced dissociation, with or without ejection of such ions. The collisional dissociation produces daughter ions which can then be analyzed.

While normally the gas pressure in rods 44 will be relatively low, it may in some cases be desired to have a higher pressure, as described in U.S. Pat. No. 4,963,736 issued Oct. 16, 1990 to the assignee of present invention. In that patent, which describes a mass spectrometer system having RF only rods feeding ions into a quadrupole mass spectrometer, a relatively high gas pressure is used in the RF only rods, and the DC voltage between the inlet plate and the RF only rods is kept relatively low. This produces a large enhancement in ion signal into the following mass spectrometer. The reason is at least in part because the collisional effects at higher pressure remove both axial and radial velocities from the ions. The ions are thus forced closer to the center line of the system so that they are more likely to pass into the mass spectrometer, and because the axial velocities are lower, they have a lower energy spread and are easier to resolve.

With the system of the invention it is also desirable to have sufficient gas pressures in rods 44, so that the ions will remain close to the center line and will have low energy speed, both helpful advantages in directing the ions into the ion trap 58. A relatively high gas pressure in rods 44 will cause ions trapped in these rods to incur numerous collisions, which will slow their axial movement back and forth within the rods 44. This will cause the ions to drain out more slowly when the rods 44 are emptied. However it is calculated that the time taken for most ions to drain from the rods 44, even at relatively high gas pressures, is quite short.

For example, assume a mass 16,950 ion with 16 charges; if plate 40 is at +10 v. DC. relative to rods 44, such ion will have 160 electron volts of energy. Such an ion will take 111 micro-seconds to travel 15 cm, with no gas present. When the rods 44 are to be emptied, half the ions will be travelling in each direction, so that it will take up to 222 micro-seconds to empty the rods 44.

If gas at a pressure of $10^{-2}$ torr is present in rods 44, the ion energy in the example given may be reduced e.g. to 0.1 electron volt in a severe case. However the time taken to empty rods 44 will still be, at most, less than 10 ms, which is quite short relative to the analysis time of the trap. Therefore, the rods 44 may be operated in the $10^{-4}$ pressure range, or indeed as high as $5\times10^{-4}$ torr, or even as high as $10^{-3}$ torr, to give a lower energy and spatial spread of the ions travelling into the ion trap 58.

Although operation has been described with quadrupole rods 44, other multipole rod sets, e.g. octopole and hexapole sets, may be used where appropriate.

I claim:

1. A method of analyzing ions in an ion trap, said method comprising the steps of:
   (a) producing a stream of said ions,
   (b) selecting a set of parallel rods having a space therebetween, said space having first and second ends,
   (c) generating a two dimensional multipole RF field in said space by applying an RF voltage to said rods,
   (d) directing said stream of ions into said first end of said space,
   (e) trapping some of said ions in said space for a predetermined period of time and ejecting others of said ions from said space, said trapping being performed by applying selected electric potentials at said ends of said space to cause ions travelling in said space from said first end toward said second end to be reflected back toward said first end and then to be reflected back again toward said second end, thus to retain ions in said space for said predetermined period of time, said predetermined period of time being longer than that required for ions to travel once through said space from said first to said second end,
   (f) releasing the ions trapped in said space through said second end of said space into said ion trap,
   (g) analyzing said ions in said ion trap, and
   (h) while said ions in said ion trap are being analyzed, refilling said space with some ions from said ion stream, and repeating said step (e) while said ions in said ion trap are being analyzed.

2. The method according to claim 1 wherein said multipole rods have a quadrupole configuration.

3. The method according to claim 1 or 2 wherein ions are ejected from said space by resonant ejection.

4. The method of claim 1 or 2 wherein ions are ejected from said space by resonant ejection, by scanning the frequency of an auxiliary RF voltage applied to said rods.

5. The method of claim 1 or 2 wherein ions are ejected from said space by resonant ejection, by scanning the amplitude of said RF voltage applied to said rods while applying a fixed frequency auxiliary voltage to said rods.

6. The method of claim 1 or 2 wherein ions are ejected from said space by resonant ejection, by applying to said rods an RF noise spectrum containing frequency components which has deleted therefrom those RF frequencies corresponding to the resonant frequencies of ions to be detected.

7. The method of claim 1 or 2 wherein ions are ejected from said space by setting the amplitude of an RF voltage applied to said rods at a level to eject ions below a predetermined mass.

8. The method of claim 1 or 2 and including the step, when ions are trapped in said space, of exciting the resonant frequency of a selected ion to cause collision induced dissociation of such ion.

9. The method of claim 1 or 2 wherein the gas pressure in said rods is in the range $10^{-3}$ torr to $10^{-4}$ torr.

10. The method of claim 1 or 2 wherein the gas pressure in said rods is about $10^{-4}$ torr.

11. The method of claim 1 or 2 wherein the gas pressure in said rods is about $5\times10^{-4}$ torr.

12. An ion inlet and processing system comprising: means for generating a stream of ions, a multipole set of parallel rods defining a space therebetween, said space having first and second ends, means for applying an RF voltage to said rods for producing a two dimensional multi-pole RF field in said space, means for directing said stream of ions through said first end into said space, control means for controlling said rods to trap some ions from said stream in said space for a predetermined period of time and to reject other ions from said space, said control means including means for applying selected electric potentials at said first and second ends to cause ions travelling in said space from said first end toward said second end to be reflected back toward said first end and then to be reflected back again toward said second end, thus to retain ions in said space for said predetermined period of time, said predetermined period of time being longer than that required for ions to travel once through said space from said first to said second end, an ion trap, said control means including means for releasing ions trapped in said space through said second end into said ion trap, said control means including means for admitting new ions from said stream into said space while said ion trap is performing an analysis, for said rods to trap some of said new ions in said space for a new said predetermined period of time and to reject others while said ion trap is performing said analysis.

* * * * *